United States Patent
Zhang

(10) Patent No.: US 9,523,030 B2
(45) Date of Patent: *Dec. 20, 2016

(54) CONTROL OF PARTICULATE ENTRAINMENT BY FLUIDS

(71) Applicant: Trican Well Service Ltd., Alberta (CA)

(72) Inventor: Kewei Zhang, Calgary (CA)

(73) Assignee: Trican Well Service Ltd (CA)

( * ) Notice: Subject to any disclaimer, the term of this patent is extended or adjusted under 35 U.S.C. 154(b) by 263 days.

This patent is subject to a terminal disclaimer.

(21) Appl. No.: 14/273,030

(22) Filed: May 8, 2014

(65) Prior Publication Data

US 2014/0243245 A1    Aug. 28, 2014

Related U.S. Application Data

(62) Division of application No. 13/541,249, filed on Jul. 3, 2012, now Pat. No. 8,800,658, which is a division of application No. 12/597,370, filed as application No. PCT/CA2008/000786 on Apr. 25, 2008, now Pat. No. 8,236,738.

(60) Provisional application No. 60/924,006, filed on Apr. 26, 2007.

(51) Int. Cl.
*E21B 43/267* (2006.01)
*C09K 8/80* (2006.01)
*C09K 8/575* (2006.01)

(52) U.S. Cl.
CPC ............... *C09K 8/805* (2013.01); *C09K 8/575* (2013.01); *C09K 8/80* (2013.01)

(58) Field of Classification Search
CPC .......... E21B 43/267; C09K 8/805; C09K 8/80
See application file for complete search history.

(56) References Cited

U.S. PATENT DOCUMENTS

| | | | |
|---|---|---|---|
| 2,331,594 A | 10/1943 | Blair, Jr. | |
| 2,419,755 A | 4/1947 | Albaugh | |
| 2,765,851 A | 10/1956 | Bond | |
| 2,885,078 A | 5/1959 | Fenske | |
| 2,935,475 A | 5/1960 | Bernard | |
| 3,060,210 A | 10/1962 | De Groote et al. | |
| 3,179,250 A | 4/1965 | Bunge et al. | |
| 3,271,307 A | 9/1966 | Dickson | |
| 3,361,213 A | 1/1968 | Savins | |
| 3,373,107 A | 3/1968 | Rice et al. | |
| 3,505,374 A | 4/1970 | Monroe | |
| 3,595,390 A | 7/1971 | Booth | |
| 3,696,923 A | 10/1972 | Miller | |
| 3,757,864 A | 9/1973 | Crawford et al. | |
| 3,857,444 A | 12/1974 | Copeland | |
| 3,864,137 A | 2/1975 | Van Bonin et al. | |
| 3,868,318 A | 2/1975 | Clark et al. | |
| 3,945,435 A | 3/1976 | Barry | |
| 3,980,136 A | 9/1976 | Plummer et al. | |
| 3,990,978 A | 11/1976 | Hill | |
| 4,000,781 A | 1/1977 | Knapp | |
| 4,003,393 A | 1/1977 | Jaggard et al. | |
| 4,007,128 A | 2/1977 | Poklacki | |
| 4,042,031 A | 8/1977 | Knapp | |
| 4,046,795 A | 9/1977 | Martin | |
| 4,054,161 A | 10/1977 | Alack | |
| 4,061,580 A | 12/1977 | Jahnke | |
| 4,183,814 A | 1/1980 | Ramachadran | |
| 4,231,428 A | 11/1980 | Needham et al. | |
| 4,301,868 A | 11/1981 | Scherubel et al. | |
| 4,316,810 A | 2/1982 | Burnham | |
| 4,368,136 A | 1/1983 | Murphey | |
| 4,454,056 A | 6/1984 | Kittelmann et al. | |
| 4,512,405 A | 4/1985 | Sweatman et al. | |
| 4,537,595 A | 8/1985 | Gruning et al. | |
| 4,564,456 A | 1/1986 | Homan | |
| 4,585,064 A | 4/1986 | Graham et al. | |
| 4,654,161 A | 3/1987 | Kollmeier et al. | |
| 4,689,085 A | 8/1987 | Plueddemann | |
| 4,725,351 A | 2/1988 | Mehrotra | |
| 4,832,702 A | 5/1989 | Kummer et al. | |
| 4,857,221 A | 8/1989 | Brookes | |
| 4,891,166 A | 1/1990 | Schaefer et al. | |
| 4,898,957 A | 2/1990 | Pleueddemann et al. | |
| 4,933,327 A | 6/1990 | Plueddemann et al. | |
| 4,960,845 A | 10/1990 | O'Lenick, Jr. | |
| 4,964,465 A | 10/1990 | Surles | |
| 5,098,979 A | 3/1992 | O'Lenick, Jr. | |
| 5,110,485 A | 5/1992 | Huddleston | |
| 5,149,765 A | 9/1992 | O'Lenick, Jr. | |

(Continued)

FOREIGN PATENT DOCUMENTS

| | | |
|---|---|---|
| CA | 1071076 | 10/1975 |
| CA | 1104804 | 12/1978 |

(Continued)

OTHER PUBLICATIONS

International Search Report and Written Opinion (PCT/CA2006/000705); Aug. 25, 2006.

(Continued)

*Primary Examiner* — Catherine Loikith

(57) ABSTRACT

An aqueous slurry composition for use in industries such as petroleum and pipeline industries that includes: a particulate, an aqueous carrier fluid, a chemical compound that renders the particulate surface hydrophobic, and a small amount of an oil. The slurry is produced by rendering the surface of the particulate hydrophobic during or before the making of the slurry. The addition of the oil greatly enhances the aggregation potential of the hydrophobically modified particulates once placed in the well bore.

30 Claims, No Drawings

(56) References Cited

U.S. PATENT DOCUMENTS

| | | |
|---|---|---|
| 5,166,297 A | 11/1992 | O'Lenick, Jr. |
| 5,209,775 A | 5/1993 | Bank et al. |
| 5,235,082 A | 8/1993 | Hill et al. |
| 5,240,760 A | 8/1993 | George et al. |
| 5,256,805 A | 10/1993 | O'Lenick, Jr. |
| 5,292,908 A | 3/1994 | Onikata et al. |
| 5,306,434 A | 4/1994 | Schueller et al. |
| 5,332,791 A | 7/1994 | Knoll et al. |
| 5,359,104 A | 10/1994 | Higgs et al. |
| 5,474,835 A | 12/1995 | McCarthy et al. |
| 5,616,758 A | 4/1997 | McCarthy et al. |
| 5,643,672 A | 7/1997 | Marchi et al. |
| 5,646,215 A | 7/1997 | Lee |
| 5,653,794 A | 8/1997 | Weber et al. |
| 5,693,837 A | 12/1997 | Smith et al. |
| 5,798,144 A | 8/1998 | Varanasi et al. |
| 5,824,226 A | 10/1998 | Boyd et al. |
| 5,858,928 A | 1/1999 | Aubert et al. |
| 6,047,772 A | 4/2000 | Weaver et al. |
| 6,060,521 A | 5/2000 | Sekutowski et al. |
| 6,132,638 A | 10/2000 | Oldenhove |
| 6,187,720 B1 | 2/2001 | Acker et al. |
| 6,277,361 B1 | 8/2001 | Murray |
| 6,297,210 B1 | 10/2001 | Hsu et al. |
| 6,323,268 B1 | 11/2001 | Fisher et al. |
| 6,403,163 B1 | 6/2002 | Fisher et al. |
| 6,482,969 B1 | 11/2002 | Helmrick et al. |
| 6,524,597 B2 | 2/2003 | Kashimoto |
| 6,586,497 B2 | 7/2003 | Gay et al. |
| 6,649,571 B1 | 11/2003 | Morgan |
| 6,696,052 B2 | 2/2004 | Aeby et al. |
| 6,729,409 B1 | 5/2004 | Gupta et al. |
| 6,736,891 B1 | 5/2004 | Bice et al. |
| 6,830,811 B2 | 12/2004 | Chao |
| 7,066,258 B2 | 6/2006 | Justus et al. |
| 7,135,231 B1 | 11/2006 | Sinclair et al. |
| 7,388,033 B2 | 6/2008 | Nagy et al. |
| 7,581,590 B2 | 9/2009 | Lesko et al. |
| 7,723,274 B2 | 5/2010 | Zhang |
| 7,977,285 B2 | 7/2011 | Zhang et al. |
| 8,105,986 B2 | 1/2012 | Zhang |
| 8,236,738 B2 | 8/2012 | Zhang |
| 8,499,835 B2 | 8/2013 | Zhang et al. |
| 2003/0102128 A1 | 6/2003 | Dawson et al. |
| 2003/0146134 A1 | 8/2003 | Yoon |
| 2003/0217953 A1 | 11/2003 | Xu et al. |
| 2004/0023818 A1 | 2/2004 | Nguyen et al. |
| 2004/0082055 A1 | 4/2004 | Hince et al. |
| 2005/0092489 A1 | 5/2005 | Welton et al. |
| 2005/0187112 A1 | 8/2005 | Goodhue et al. |
| 2005/0194142 A1 | 9/2005 | Nguyen et al. |
| 2005/0244641 A1 | 11/2005 | Vincent |
| 2005/0252658 A1 | 11/2005 | Willingham et al. |
| 2006/0260810 A1 | 11/2006 | Weaver et al. |
| 2007/0015669 A1 | 1/2007 | Zhang |
| 2007/0129257 A1 | 6/2007 | Kippie et al. |
| 2007/0144736 A1 | 6/2007 | Shinbach |
| 2007/0197402 A1 | 8/2007 | O'neil et al. |
| 2008/0173451 A1 | 7/2008 | Reddy et al. |
| 2010/0029515 A1 | 2/2010 | O'Neil et al. |
| 2010/0197526 A1 | 8/2010 | Zhang |
| 2010/0256024 A1 | 10/2010 | Zhang |
| 2010/0267593 A1 | 10/2010 | Zhang |
| 2011/0011589 A1 | 1/2011 | Zhang et al. |
| 2012/0071371 A1 | 3/2012 | Zhang |
| 2012/0181019 A1 | 7/2012 | Saini et al. |
| 2012/0245276 A1 | 9/2012 | Hagadorn et al. |
| 2012/0267105 A1 | 10/2012 | Zhang |
| 2012/0267112 A1 | 10/2012 | Zhang et al. |
| 2012/0322697 A1 | 12/2012 | Zhang |
| 2014/0243245 A1 | 8/2014 | Zhang |
| 2015/0252254 A1 | 9/2015 | Zhang et al. |
| 2016/0017213 A1 | 1/2016 | Zhang et al. |

FOREIGN PATENT DOCUMENTS

| | | |
|---|---|---|
| CA | 1250856 | 3/1989 |
| CA | 2009732 | 8/1990 |
| CA | 2408052 | 8/2001 |
| CA | 2329600 | 6/2002 |
| CA | 2423031 | 10/2003 |
| CA | 2213168 | 1/2005 |
| CA | 2509115 | 12/2005 |
| CA | 2545563 | 11/2006 |
| CA | 2531982 | 7/2007 |
| CA | 2683516 | 10/2008 |
| CA | 2684966 | 11/2008 |
| CA | 2848264 | 11/2008 |
| CA | 2693427 | 1/2009 |
| CA | 2708144 | 6/2009 |
| CA | 2547150 | 1/2010 |
| CA | 2643251 | 5/2010 |
| CA | 2690768 | 7/2011 |
| CA | 2787132 | 7/2011 |
| CA | 2735428 | 9/2011 |
| EP | 113310 | 7/1984 |
| EP | 0266043 | 5/1988 |
| GB | 1584831 | 2/1981 |
| GB | 2387191 | 10/2003 |
| JP | 58-146434 | 9/1983 |
| SU | 1126590 | 11/1984 |
| WO | 0202759 | 3/2002 |
| WO | 03018508 | 3/2003 |
| WO | 2005100007 | 10/2005 |
| WO | 2005/124099 | 12/2005 |
| WO | 2006116868 | 11/2006 |
| WO | 2007033489 | 3/2007 |
| WO | 2007/145734 | 12/2007 |
| WO | 2008124919 | 10/2008 |
| WO | 2008/131540 | 11/2008 |

OTHER PUBLICATIONS

International Search Report and Written Opinion (PCT/CA2006/001567); Jan. 3, 2007.
lhternational Search Report and Written Opinion (PCT/CA2008/001293); Nov. 10, 2008.
International Search Report and Written Opinion (PCT/CA2011/000065); Apr. 11, 2011.
Extended European Search Report (EP 11734286.5); May 31, 2013.

CONTROL OF PARTICULATE ENTRAINMENT BY FLUIDS

CROSS REFERENCE TO RELATED APPLICATIONS

This is a divisional application of U.S. application Ser. No. 13/541,249, filed Jul. 3, 2012 (pending). U.S. application Ser. No. 13/541,249 is a divisional application of U.S. application Ser. No. 12/597,370, filed Jun. 23, 2010 (now U.S. Pat. No. 8,236,738). U.S. Pat. No. 8,236,738 was filed as a national stage application under 35 U.S.C. §371 of International Application No. PCT/CA08/00786, filed Apr. 25, 2008. International Application No. PCT/CA08/00786 cites the priority of Provisional U.S. Application No. 60/924,006, filed Apr. 26, 2007.

FIELD

This invention relates to fluid compositions and their use in controlling proppant flowback after a hydraulic fracturing treatment and in reducing formation sand production along with fluids in poorly consolidated formations.

BACKGROUND

Hydraulic fracturing operations are used extensively in the petroleum industry to enhance oil and gas production. In a hydraulic fracturing operation, a fracturing fluid is injected through a wellbore into a subterranean formation at a pressure sufficient to initiate fractures to increase oil and gas production.

Frequently, particulates, called proppants, are suspended in the fracturing fluid and transported into the fractures as a slurry. Proppants include sand, ceramic particles, glass spheres, bauxite (aluminum oxide), resin coated proppants, synthetic polymeric beads, and the like. Among them, sand is by far the most commonly used proppant.

Fracturing fluids in common use include aqueous and non-aqueous ones including hydrocarbon, methanol and liquid carbon dioxide fluids. The most commonly used fracturing fluids are aqueous fluids including water, brines, water containing polymers or viscoelastic surfactants and foam fluids.

At the last stage of a fracturing treatment, fracturing fluid is flowed back to the surface and proppants are left in the fractures to prevent them from closing back after the hydraulic fracturing pressure is released. The proppant filled fractures provide high conductive channels that allow oil and/or gas to seep through to the wellbore more efficiently. The conductivity of the proppant packs formed after proppant settles in the fractures plays a dominant role in increasing oil and gas production.

However, it is not unusual for a significant amount of proppant to be carried out of the fractures and into the well bore along with the fluids being flowed back out the well. This process is known as proppant flowback. Proppant flowback is highly undesirable since it not only reduces the amount of proppants remaining in the fractures resulting in less conductive channels, but also causes significant operational difficulties. It has long plagued the petroleum industry because of its adverse effect on well productivity and equipment.

Numerous methods have been attempted in an effort to find a solution to the problem of proppant flowback. The commonly used method is the use of so-called "resin-coated proppants". The outer surfaces of the resin-coated proppants have an adherent resin coating so that the proppant grains are bonded to each other under suitable conditions forming a permeable barrier and reducing the proppant flowback.

The substrate materials for the resin-coated proppants include sand, glass beads and organic materials such as shells or seeds. The resins used include epoxy, urea aldehyde, phenol-aldehyde, furfural alcohol and furfural. The resin-coated proppants can be either pre-cured or can be cured by an over-flush of a chemical binding agent, commonly known as activator, once the proppants are in place.

Different binding agents have been used. U.S. Pat. Nos. 3,492,147 and 3,935,339 disclose compositions and methods of coating solid particulates with different resins. The particulates to be coated include sand, nut shells, glass beads, and aluminum pellets. The resins used include urea-aldehyde resins, phenol-aldehyde resins, epoxy resins, furfuryl alcohol resins, and polyester or alkyl resins. The resins can be in pure form or mixtures containing curing agents, coupling agents or other additives. Other examples of resins and resin mixtures for proppants are described, for example, in U.S. Pat. Nos. 5,643,669; 5,916,933; 6,059,034 and 6,328,105.

However, there are significant limitations to the use of resin-coated proppants. For example, resin-coated proppants are much more expensive than normal sands, especially considering that a fracturing treatment usually employs tons of proppants in a single well. Normally, when the formation temperature is below 60° C., activators are required to make the resin-coated proppants bind together. This increases the cost.

Thus, the use of resin-coated proppants is limited by their high cost to only certain types of wells, or to use in only the final stages of a fracturing treatment, also known as the "tail-in" of proppants, where the last few tons of proppants are pumped into the fracture. For less economically viable wells, application of resin-coated proppants often becomes cost prohibitive.

During hydrocarbon production, especially from poorly consolidated formations, small particulates, typically of sand, often flow into the wellbore along with produced fluids. This is because the formation sands in poorly consolidated formations are bonded together with insufficient bond strength to withstand the forces exerted by the fluids flowing through and are readily entrained by the produced fluids flowing out of the well.

The produced sand erodes surface and subterranean equipment, and requires a removal process before the hydrocarbon can be processed. Different methods have been tried in an effort to reduce formation sand production. One approach employed is to filter the produced fluids through a gravel pack retained by a screen in the wellbore, where the particulates are trapped by the gravel pack. This technique is known as gravel packing. However, this technique is relatively time consuming and expensive. The gravel and the screen can be plugged and eroded by the sand within a relatively short period of time.

Another method that has been employed in some instances is to inject various resins into a formation to strengthen the binding of formation sands. Such an approach, however, results in uncertainty and sometimes creates undesirable results. For example, due to the uncertainty in controlling the chemical reaction, the resin may set in the well bore itself rather than in the poorly consolidated producing zone. Another problem encountered in the use of resin compositions is that the resins normally have short shelf lives. For example, it can lead to costly waste if the operation using the resin is postponed after the resin is mixed.

Thus, it is highly desirable to have a cost effective composition and a method that can control proppant flowback after fracturing treatment. It is also highly desirable to have a composition and a method of reducing formation sand production from the poorly consolidated formation.

SUMMARY

The present invention in one embodiment relates to an aqueous slurry composition having water, particulates, a chemical compound for rendering the surface of the particulates hydrophobic and an oil.

The present invention in another embodiment relates to a method of controlling sand in a hydrocarbon producing formation comprising the steps of mixing water, particulates and a chemical compound for rendering the surface of the particulates hydrophobic, pumping the mixture into the formation.

DETAILED DESCRIPTION OF THE INVENTION

Aggregation phenomena induced by hydrophobic interaction in water are observed everywhere, in nature, industrial practice, as well as in daily life. In general, and without being bound by theory, the hydrophobic interaction refers to the attractive forces between two or more apolar particles in water. When the hydrophobic interaction becomes sufficiently strong, the hydrophobic particles come together to further reduce the surface energy, essentially bridging the particles together and resulting in the formation of particle aggregations, known as hydrophobic aggregations. It is also known that micro-bubbles attached to hydrophobic particle surfaces also tend to bridge the particles together.

In this invention the concept of hydrophobic aggregation is applied to develop compositions and methods to control proppant flowback as well as to reduce formation sand production during well production. Unlike in conventional approaches, where attention is focused on making proppants or sand particles sticky through formation of chemical bonds between resins coated on the particle surfaces, in the present invention the attention is focused on making particle aggregations by bridging the particles through strong hydrophobic force or micro-bubbles. Moreover, the hydrophobic surfaces of the particles induced by the present compositions reduce the friction between the particles and water making them harder to be entrained by fluids flowing out of the well.

In general, only a limited amount of agents is required in the present invention, and the field operational is simple.

There are different ways of carrying out the invention. For example, during a fracturing operation, a proppant, for example, sand, which is naturally hydrophilic and can be easily water wetted, is mixed with a fluid containing a chemical agent, referred as hydrophobizing agent, which makes the sand surface hydrophobic. The hydrophobizing agent can be simply added into a sand slurry comprising sand and fracturing fluid which is pumped down the well. Depending on the hydrophobizing agent used and the application conditions, different fracturing fluids (aqueous or non-aqueous fluids) can be used. Aqueous fluid is normally preferred. Of particular interest as a fracturing fluid, is water, or brine or water containing a small amount of a friction reducing agent, also known as slick-water.

The hydrophobizing agent can be applied throughout the proppant stage or during a portion of the proppant stage such as the last portion of the proppant stage, i.e., tail-in. Alternatively, sand can be hydrophobized first and dried and then used to make a slurry and pumped into fracture.

It has been discovered that when a small amount of an oil, including hydrocarbon oil and silicone oil, is mixed into the aqueous slurry containing the hydrophobized sands, the hydrophobic aggregation is enhanced significantly. The possible explanation for this is that the concentration of oil among the hydrophobic sands may further enhance the bridge between sand grains.

The present invention can be used in a number of ways. For example, in a fracture operation, proppant such as sand is mixed with a hydrophobizing agent in water based slurry and pumped into the fractures, and then followed by over flush with oil or water containing a small amount of oil to strengthen the bridge between the sand grains. Similarly, the same operation can be applied in the tail-in stage. Alternatively the slurry containing a hydrophobizing agent can be pumped into the fracture forming the proppant pack, which can be further consolidated by oil or condensate contained in the formation. Or the pre-hydrophobized sand is used as proppant and then followed by flushing with water, containing small amount of oil. Or the pre-hydrophobized sand is used as proppant which can be further consolidated by oil or condensate contained in the formation. Or the pre-hydrophobized sand is tailed in and followed by flushing with water containing small amount of oil. In all such operations, a gas such as nitrogen, carbon dioxide or air can be mixed into the fluid.

There are different ways of pre-treating the solid surface hydrophobic. For example, one may thoroughly mix the proppants, preferable sands, with a fluid containing the appropriate hydrophobizing agent for certain period of time. After the proppant grains are dried, they can be used in fracturing operations. Different fluids can be used. Different hydrophobizing agents may need different conditions to interact with the solid surface. When an aqueous fluid is used, the pH of the fluid may also play a role.

Besides controlling proppant flowback in hydraulic fracturing treatments, the present invention is also useful in reducing formation sand production during well production. In the majority of cases, sand production increases substantially when wells begin to produce water. The formation sand is normally hydrophilic, or water-wet, and therefore is easily entrained by a flowing water phase. Depending on the hydrophobizing agent used and the operational conditions, different carrying fluids, aqueous or non-aqueous, can be used. There are different methods, according to the present invention, to treat a formation to reduce formation sand production. For example, a fluid, preferably an aqueous fluid, containing an appropriate amount of hydrophobizing agent can be injected into the poorly consolidated formation. After the sand grains become hydrophobic they tend to aggregate together. The hydrophobic surfaces also reduce the dragging force exerted by the aqueous fluid making them more difficult to be entrained by the formation fluid. If the water phase contains certain amount of oil, the hydrophobic aggregation between sand grains can be further enhanced. Alternatively, the fluid contain the hydrophobizing agent can be first injected into the poorly consolidated formation, and then followed by injecting small volume of oil or a fluid containing oil. In all these applications, a gas such as nitrogen, carbon dioxide or air can be mixed into the fluid.

Also, the compositions and methods of the present invention can be used in gravel pack operations, where the slurry containing hydrophobised sands are added in the well bore to remediate sand production.

There are various types of hydrophobizing agents for sand, which can be used in the present invention. For example, it is known that many organosilicon compounds including organosiloxane, organosilane, fluoroorganosiloxane and fluoro-organosilane compounds are commonly used to render various surfaces hydrophobic. For example, see U.S. Pat. Nos. 4,537,595; 5,240,760; 5,798,144; 6,323,268; 6,403,163; 6,524,597 and 6,830,811 which are incorporated herein by reference for such teachings.

Organosilanes are compounds containing silicon to carbon bonds. Organosiloxanes are compounds containing Si—O—Si bonds. Polysiloxanes are compounds in which the elements silicon and oxygen alternate in the molecular skeleton, i.e., Si—O—Si bonds are repeated. The simplest polysiloxanes are polydimethylsiloxanes.

Polysiloxane compounds can be modified by various organic substitutes having different numbers of carbons, which may contain N, S, or P moieties that impart desired characteristics. For example, cationic polysiloxanes are compounds in which organic cationic groups are attached to the polysiloxane chain, either at the middle or the end. Normally the organic cationic group may contain a hydroxyl group or other functional groups containing N or O. The most common organic cationic groups are alkyl amine derivatives including secondary, tertiary and quaternary amines (for example, quaternary polysiloxanes including, quaternary polysiloxanes including mono- as well as, di-quaternary polysiloxanes, amido quaternary polysiloxanes, imidazoline quaternary polysiloxanes and carboxy quaternary polysiloxanes.

Similarly, the polysiloxane can be modified by organic amphoteric groups, where one or more organic amphoteric groups are attached to the polysiloxane chain, either at the middle or the end, and include betaine polysiloxanes and phosphobetaine polysiloxanes.

Similarly, the polysiloxane can be modified by organic anionic groups, where one or more organic anionic groups are attached to the polysiloxane chain, either at the middle or the end, including sulfate polysiloxanes, phosphate polysiloxanes, carboxylate polysiloxanes, sulfonate polysiloxanes, thiosulfate polysiloxanes. The organosiloxane compounds also include alkylsiloxanes including hexamethylcyclotrisiloxane, octamethylcyclotetrasiloxane, decamethylcyclopentasiloxane, hexamethyldisiloxane, hexaethyldisiloxane, 1,3-divinyl-1,1,3,3-tetramethyldisiloxane, octamethyltrisiloxane, decamethyltetrasiloxane.

The organosilane compounds include alkylchlorosilane, for example methyltrichlorosilane, dimethylchlorosilane, trimethylchlorosilane, octadecyltrichlorosilane; alkyl-alkoxysilane compounds, for example methyl-, propyl-, isobutyl- and octyltrialkoxysilanes, and fluoro-organosilane compounds, for example, 2-(n-perfluoro-octyl)-ethyltriethoxysilane, and perfluorooctyldimethyl chlorosilane.

Other types of chemical compounds, which are not organosilicon compounds, which can be used to render particulate surface hydrophobic are certain fluoro-substituted compounds, for example certain fluoro-organic compounds including cationic fluoro-organic compounds.

Further information regarding organosilicon compounds can be found in Silicone Surfactants (Randal M. Hill, 1999) and the references therein, and in U.S. Pat. Nos. 4,046,795; 4,537,595; 4,564,456; 4,689,085; 4,960,845; 5,098,979; 5,149,765; 5,209,775; 5,240,760; 5,256,805; 5,359,104; 6,132,638 and 6,830,811 and Canadian Patent No. 2,213,168 which are incorporated herein by reference for such teachings.

Organosilanes can be represented by the formula $$R_nSiX_{(4-n)} \quad (I)$$

wherein R is an organic radical having 1-50 carbon atoms that may possess functionality containing N, S, or P moieties that imparts desired characteristics, X is a halogen, alkoxy, acyloxy or amine and n has a value of 0-3. Examples of organosilanes include:

$CH_3SiCl_3$, $CH_3CH_2SiCl_3$, $(CH_3)_2SiCl_2$, $(CH_3CH_2)_2SiCl_2$, $(C_6H_5)_2SiCl_2$, $(C_6H_5)SiCl_3$, $(CH_3)_3SiCl$, $CH_3HSiCl_2$, $(CH_3)_2HSiCl$, $CH_3SiBr_3$, $(C_6H_5)SiBr_3$, $(CH_3)_2SiBr_2$, $(CH_3CH_2)_2SiBr_2$, $(C_6H_5)_2SiBr_2$, $(CH_3)_3SiBr$, $CH_3HSiBr_2$, $(CH_3)HSiBr$, $Si(OCH_3)_4$, $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_2$, $C_6H_5CH_2Si(OCH_3)_3$, $C_6H_5Si(OCH_2CH_3)_3$, $CH_2=CHCH_2Si(OCH_3)_3$, $(CH_3)_2Si(OCH_3)_2$, $(CH_2=CH)Si(CH_3)_2Cl$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2=CH)_2Si(OCH_3)_2$, $(CH_2=CHCH_2)_2Si(OCH_3)_2$, $(CH_3)_3SiOCH_3$, $CH_3HSi(OCH_3)_2$, $(CH_3)_2HSi(OCH_3)$, $CH_3Si(OCH_2CH_2CH_3)_3$, $(CH_2=CHCH_2)_2Si(OCH_2CH_2OCH_3)_2$, $(CH_2=CHCH_2)_2Si(OCH_2CH_2OCH_3)_2$, $(C_6H_5)_2Si(OCH_2CH_2OCH_3)_2$, $(CH_3)_2Si(OCH_2CH_2OCH_3)_2$, $CH_2=CH)_2Si(OCH_2CH_2OCH_3)_2$, $(CH_2=CHCH_2)_2Si(OCH_2CH_2OCH_3)_2$, $(C_6H_5)_2Si(OCH_2CH_2OCH_3)_2$, $CH_3Si(CH_3COO)_3$, 3-aminotriethoxysilane, methyldiethylchlorosilane, butyltrichlorosilane, diphenyldichlorosilane, vinyltrichlorosilane, methyltrimethoxysilane, vinyltriethoxysilane, vinyltris(methoxyethoxy)silane, methacryloxypropyltrimethoxysilane, glycidoxypropyltrimethoxysilane, aminopropyltriethoxysilane, divinyldi-2-methoxysilane, ethyltributoxysilane, isobutyltrimethoxysilane, hexyltrimethoxysilane, n-octyltriethoxysilane, dihexyldimethoxysilane, octadecyltrichlorosilane, octadecyltrimethoxysilane, octadecyldimethylchlorosilane, octadecyldimethylmethoxysilane and quaternary ammonium silanes including 3-(trimethoxysilyl)propyldimethyloctadecyl ammonium chloride, 3-(trimethoxysilyl)propyldimethyloctadecyl ammonium bromide, 3-(trimethylethoxysilylpropyl)didecylmethyl ammonium chloride, triethoxysilyl soyapropyl dimonium chloride, 3-(trimethylethoxysilylpropyl)didecylmethyl ammonium bromide, 3-(trimethylethoxysilylpropyl)didecylmethyl ammonium bromide, triethoxysilyl soyapropyl dimonium bromide, $(CH_3O)_3Si(CH_2)_3P^+(C_6H_5)_3Cl^-$, $(CH_3O)_3Si(CH_2)_3P^+(C_6H_5)_3Br^-$, $(CH_3O)_3Si(CH_2)_3P^+(CH_3)_3Cl^-$, $(CH_3O)_3Si(CH_2)_3P^+(C_6H_{13})_3Cl^-$, $(CH_3O)_3Si(CH_2)_3N^+(CH_3)_2C_4H_9Cl$, $(CH_3O)_3Si(CH_2)_3N^+(CH_3)_2CH_2C_6H_5Cl^-$, $(CH_3O)_3Si(CH_2)_3N^+(CH_3)_2CH_2CH_2OHCl^-$, $(CH_3O)_3Si(CH_2)_3N^+(C_2H_5)_3Cl^-$, $(C_2H_5O)_3Si(CH_2)_3N^+(CH_3)_2C_{18}H_{37}Cl^-$.

Among different organosiloxane compounds which are useful for the present invention, polysiloxanes modified with organic amphoteric or cationic groups including organic betaine polysiloxanes and organic quaternary polysiloxanes are examples. One type of betaine polysiloxane or quaternary polysiloxane is represented by the formula

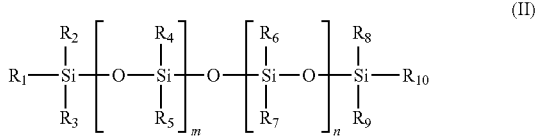

(II)

wherein each of the groups $R_1$ to $R_6$, and $R_8$ to $R_{10}$ represents an alkyl containing 1-6 carbon atoms, typically a methyl group, $R_7$ represents an organic betaine group for betaine polysiloxane, or an organic quaternary group for quaternary polysiloxane, and have different numbers of carbon atoms, and may contain a hydroxyl group or other functional groups containing N, P or S, and m and n are from 1 to 200. For example, one type of quaternary polysiloxanes is when $R_7$ is represented by the group

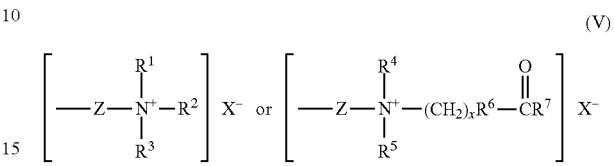

(III)

wherein $R^1$, $R^2$, $R^3$ are alkyl groups with 1 to 22 carbon atoms or alkenyl groups with 2 to 22 carbon atoms. $R^4$, $R^5$, $R^7$ are alkyl groups with 1 to 22 carbon atoms or alkenyl groups with 2 to 22 carbon atoms; $R^6$ is —O— or the $NR^8$ group, $R^8$ being an alkyl or hydroxyalkyl group with 1 to 4 carbon atoms or a hydrogen group; Z is a bivalent hydrocarbon group with at least 4 carbon atoms, which may have a hydroxyl group and may be interrupted by an oxygen atom, an amino group or an amide group; x is 2 to 4; The $R^1$, $R^2$, $R^3$, $R^4$, $R^5$, $R^7$ may be the same or the different, and X— is an inorganic or organic anion including Cl" and $CH_3COO$—.

Examples of organic quaternary groups include [R—N$^+$(CH3)$_2$-CH$_2$CH(OH)CH2-O—(CH$_2$)$_3$—](CH3COO—), wherein R is an alkyl group containing from 1-22 carbons or an benzyl radical and CH3COO— an anion. Examples of organic betaine include —(CH$_2$)$_3$—O—CH$_2$CH(OH)(CH$_2$)—N$^+$(CH3)$_2$CH$_2$COO—. Such compounds are commercial available. Betaine polysiloxane copolyol is one of examples. It should be understood that cationic polysiloxanes include compounds represented by formula (II), wherein $R_7$ represents other organic amine derivatives including organic primary, secondary and tertiary amines.

Other examples of organo-modified polysiloxanes include di-betaine polysiloxanes and di-quaternary polysiloxanes, where two betain or quaternary groups are attached to the siloxane chain. One type of the di-betaine polysiloxane and di-quaternary polysiloxane can be represented by the formula

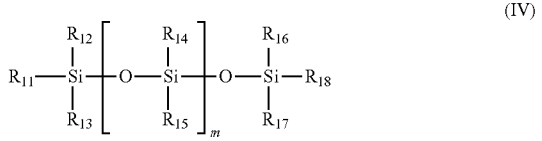

(IV)

wherein the groups $R_{12}$ to $R_{17}$ each represents an alkyl containing 1-6 carbon atoms, typically a methyl group, both $R_{11}$ and $R_{18}$ group represent an organic betaine group for di-betaine polysiloxanes or an organic quaternary group for di-quaternary, and have different numbers of carbon atoms and may contain a hydroxyl group or other functional groups containing N, P or S, and m is from 1 to 200. For example, one type of di-quaternary polysiloxanes is when $R_{11}$ and $R_{18}$ are represented by the group

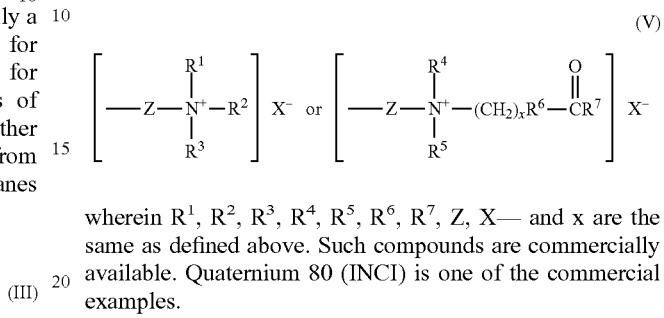

(V)

wherein $R^1$, $R^2$, $R^3$, $R^4$, $R^5$, $R^6$, $R^7$, Z, X— and x are the same as defined above. Such compounds are commercially available. Quaternium 80 (INCI) is one of the commercial examples.

It will be appreciated by those skilled in the art that cationic polysiloxanes include compounds represented by formula (III), wherein $R_{11}$ and $R_{18}$ represents other organic amine derivatives including organic primary, secondary and tertiary amines. It will be apparent to those skilled in the art that there are different mona- and di-quaternary polysiloxanes, mono- and di-betaine polysiloxanes and other organomodified polysiloxane compounds which can be used to render the solid surfaces hydrophobic and are useful in the present invention. These compounds are widely used in personal care and other products, for example as discussed in U.S. Pat. Nos. 4,054,161; 4,654,161; 4,891,166; 4,898,957; 4,933,327; 5,166,297; 5,235,082; 5,306,434; 5,474,835; 5,616,758; 5,798,144; 6,277,361; 6,482,969; 6,323,268 and 6,696,052 which are incorporated herein by reference for such teachings.

Another example of organosilicon compounds which can be used in the composition of the present invention are fluoro-organosilane or fluroorganosiloxane compounds in which at least part of the organic radicals in the silane or siloxane compounds are fluorinated. Suitable examples are fluorinated chlorosilanes or fluorinated alkoxysilanes including 2(n-perfluorooctyl)ethyltriethoxysilane, perfluoro-octyldimethylchlorosilane,
$(CF_3CH_2CH_2)_2Si(OCH_3)_2$, $CF_3CH_2CH_2Si(OCH_3)_3$, $(CF_3CH_2CH_2)_2Si(OCH_2CH_2OCH_3)_2$ and $CF_3CH_2CH_2Si(OCH_2CH_2OCH_3)_3$ and $(CH_3O)_3Si(CH_2)_3N^+(CH_3)_2(CH_2)_3NHC(O)(CF_2)_6CF_3Cl$—.
Other compounds which can be used, but less preferable, are fluoro-substituted compounds, which are not organic silicon compounds, for example, certain fluoro-organic compounds.

The following provides several non-limiting examples of compositions and methods according to the present invention.

Example 1

300 g of 20/40 US mesh frac sand was added into 1000 ml of water containing 2 ml of a solution containing 20 vol % Tegopren 6924, a di-quaternary polydimethylsiloxane from Degussa Corp., and 80 vol % of ethylene glycol mono-butyl ether, and 1 ml of TEGO Betaine 810, capryl/capramidopropyl betaine, an amphoteric hydrocarbon surfactant from Degussa Corp. The slurry was shaken up and then let stand to allow sands settle down. When tilted slowly, the settled sand tended to move as cohesive masses. After 10 ml of silicon oil, where its viscosity is 200 cp, was mixed into the shiny and shaken up sand grains were visually observed to clump together forming strong bridge among each other.

The solution was decanted, and the sand was dried overnight at the room temperature for further tests.

Example 2

200 g of pre-treated sand according to Example 1 was placed in a fluid 1055 chamber to form a sand pack and wetted with water. Afterward, 300 ml of water was allowed to filter from the top through the sand pack. The time was stopped when water drops slowed to less than one every five seconds. Same test using untreated sand was carried out as the reference. The average filter time over 6 runs for the pre-treated sand was 2 minutes and 5 seconds, while it was 5 minutes for the untreated sand.

Example 3

200 g of pre-treated sand according to Example 1 was placed in a fluid loss chamber to form a sand pack and wetted with kerosene. Afterward, 300 ml of kerosene was allowed to filter from the top through the sand pack. The time was stopped when kerosene drops slowed to less than one every five seconds. Same test using untreated sand was carried out as the reference. The average filter time over 5 runs for the pre-treated sand was 3 minutes and 2 seconds, while it was 3 minutes and 28 seconds for the untreated sand.

Example 4

100 ml of water and 25 grams of 30/50 US mesh fracturing sands were added into each of two glass bottles (200 ml). The first sample was used as the reference. In the second sample, 2 ml of a solution containing 20% Tegopren 6924 and 80% of ethylene glycol mono-butyl ether, and 0.5 ml of kerosene were added. The slurry was shaken up and then let stand to allow sands settle down. When tilted slowly, the settled sand tended to move as cohesive masses. Sand grains were visually observed to clump together forming strong bridge among each others.

Example 5

100 ml of water and 25 grains of 30/50 US mesh fracturing sands were added into each of two glass bottles (200 ml). The first sample was used as the reference. In the second sample, 2 ml of a solution containing 20% Tegopren 6924 and 80% of ethylene glycol mono-butyl ether, and 0.5 ml of frac oil were added. The slurry was shaken up and then let stand to allow sands settle down. When tilted slowly, the settled sand tended to move as cohesive masses. Sand grains were visually observed to clump together forming strong bridge among each others.

What is claimed:

1. A method of making a hydraulic fracturing fluid composition comprising the steps of:
contacting particulates having a surface with a medium containing a chemical compound to render the surface of the particulates hydrophobic;
separating the particulate from the medium; and
mixing the hydrophobic particulate with water and an oil to form a mixture; wherein the particulates are proppants.

2. The method of claim 1, wherein the particulates are selected from the group consisting of sand, resin coated sand, synthetic polymeric beads, ceramic proppants, glass spheres, bauxite and combinations thereof.

3. The method of claim 2, wherein the particulates are sand or ceramic proppants.

4. The method of claim 3, wherein the method further comprises the step of adding a friction reducing agent in the fluid.

5. The method of claim 3, wherein the method further comprises mixing a gas with the mixture.

6. The method of claim 2, wherein the method further comprises the step of adding a friction reducing agent in the fluid.

7. The method of claim 2, wherein the method further comprises mixing a gas with the mixture.

8. The method of claim 1, wherein the chemical compound is selected from the group consisting of an organosilane, an organosiloxane, a fluoro-organosilane, a fluoro-organosiloxane, a fluoro-organic compound and combinations thereof.

9. The method of claim 8, wherein the chemical compound is an organosilane having the formula $$R_nSiX_{(4-n)}$$

wherein R is an organic radical having 1-50 carbon atoms, X is a halogen, alkoxy, acyloxy or amine and n has a value of 1-3.

10. The method of claim 9, wherein the chemical compound is selected from the group consisting of: $CH_3SiCl_3$, $CH_3CH_2SiCl_3$, $(CH_3)_2SiCl_2$, $(CH_3CH_2)_2SiCl_2$, $(C_6H_5)_2SiCl_2$, $(C_6H_5)SiCl_3$, $(CH_3)_3SiCl$, $CH_3HSiCl_2$, $(CH_3)_2HSiCl$, $CH_3SiBr_3$, $(C_6H_5)SiBr_3$, $(CH_3)_2SiBr_2$, $(CH_3CH_2)_2SiBr_2$, $(C_6H_5)_2SiBr_2$, $(CH_3)_3SiBr$, $CH_3HSiBr_2$, $(CH_3)_2HSiBr$, $Si(OCH_3)_4$, $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHCH_2Si(OCH_3)_3$, $(CH_3)_2Si(OCH_3)_2$, $(CH_3)_2Si(OCH_2CH_3)_2$, $(CH_3)_2Si(OCH_2CH_2CH_3)_2$, $(CH_3)_2Si[O(CH_2)_3CH_3]_2$, $(CH_3CH_2)_2Si(OCH_2CH_3)_2$, $(C_6H_5)_2Si(OCH_3)_2$, $(C_6H_5CH_2)_2Si(OCH_3)_2$, $(C_6H_5)_2Si(OCH_2CH_3)_2$, $(CH_2=CH)_2Si(OCH_3)_2$, $(CH_2=CHCH_2)_2Si(OCH_3)_2$, $(CH_3)_3SiOCH_3$, $CH_3HSi(OCH_3)_2$, $(CH_3)_2HSi(OCH_3)$, $CH_3Si(OCH_2CH_2CH_3)_3$, $(CH_2=CHCH_2)_2Si(OCH_2CH_2OCH_3)_2$, $(C_6H_5)_2Si(OCH_2CH_2OCH_3)_2$, $(CH_3)_2Si(OCH_2CH_2OCH_3)_2$, $(CH_2=CH)_2Si(OCH_2CH_2OCH_3)_2$, $(CH=CHCH_2)_2Si(OCH_2CH_2OCH_3)_2$, $(C_6H_5)_2Si(OCH_2CH_2OCH_3)_2$, $CH_3Si(CH_3COO)_3$, methyldiethylchlorosilane, butyltrichlorosilane diphenyldichlorosilane, vinyltrichlorosilane, methyltrimethoxysilane, vinyltriethoxysilane, vinyltris(methoxyethoxy)silane, methacryloxypropyltrimethoxysilane, glycidoxypropyltrimethoxysilane, aminopropyltriethoxysilane, divinyldi-2-methoxysilane, ethyltributoxysilane, isobutyltrimethoxysilane, hexyltrimethoxysilane, n-octyltriethoxysilane, dihexyldimethoxysilane; trichloro-octadecylsilane, 3-(trimethoxysilyl)propyldimethyloctadecyl ammonium chloride, 3-(trimethylethoxysilylpropyl)didecylmethyl ammonium chloride and triethoxysilyl soyapropyl dimonium chloride.

11. The method of claim 8, wherein the chemical compound is a fluoro-organic compound.

12. The method of claim 8, wherein the chemical compound is a fluoro-organosilane.

13. The method of claim 8, wherein the chemical compound is a fluoro-organosiloxane.

14. The method of claim 8, wherein the chemical compound is a cationic fluoro-organic compound.

15. The method according to claim 8, wherein the chemical compound is an alkoxy silane.

16. The method of claim 8, wherein the method further comprises the step of adding a friction reducing agent in the fluid.

17. The method of claim 8, wherein the method further comprises mixing a gas with the mixture.

18. The method of claim 1, wherein the chemical compound is selected from the group consisting of 2-(n-perfluoro-octyl)ethyltriethoxysilane, perfluoro-octyldimethylchlorosilane, $(CF_3CH_2CH_2)_2Si(OCH_3)_2$, $CF_3CH_2CH_2Si(OCH_3)_3$, $(CF_3CH_2CH_2)_2Si(OCH_2CH_2OCH_3)_2$ and $CF_3CH_2CH_2Si(OCH_2CH_2OCH_3)_3$ and $(CH_3O)_3Si(CH_2)_3N^+(CH_3)_2(CH_2)_3NHC(O)(CF_2)_6CF_3Cl^-$.

19. The method of claim 1, wherein the chemical compound is selected from the group consisting of polysiloxanes modified with one or more organic cationic groups, polysiloxanes modified with one or more organic amphoteric groups, polysiloxanes modified with one or more organic anionic groups, amine silanes and combinations thereof.

20. The method of claim 19, wherein the chemical compound is selected from the group consisting of polysiloxanes modified with one or more organic cationic groups.

21. The method of claim 19, wherein the chemical compound is selected from the group consisting of polysiloxanes modified with one or more organic amphoteric groups.

22. The method of claim 19, wherein the chemical compound is an amine silane.

23. The method according to claim 19, wherein the chemical compound is an organo-polysiloxane having the formula

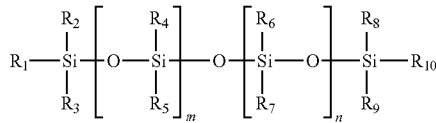

wherein each of $R_1$ to $R_6$ and $R_8$ to $R_{10}$, represents an organic radical containing 1-6 carbon atoms, $R_7$ represents an organic amphoteric group for an organic amphoteric polysiloxane or an organic cationic group for an organic cationic polysiloxane, and m and n are from 1 to 200.

24. The method according to claim 19, wherein the chemical compound is an organo-siloxane having the formula

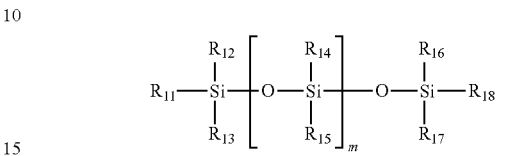

where $R_{12}$ to $R_{17}$ each represents an organic radical containing 1-6 carbon atoms, one of $R_{11}$ and $R_{18}$ represents an organic amphoteric group and the other of $R_{11}$ and $R_{18}$ represents an organic amphoteric group or an organic radical for a di-betaine polysiloxane or one of $R_{11}$ and $R_{18}$ represents an organic cationic group and the other of $R_{11}$ and $R_{18}$ represents an organic cationic group or an organic radical for a di-cationic polysiloxane, and m is 1 to 200.

25. The method of claim 1, wherein the oil is selected from the group consisting of a hydrocarbon oil, a silicone oil, kerosene oil, a frac oil and combinations thereof.

26. The method of claim 1, wherein the method further comprises the step of adding a friction reducing agent in the fluid.

27. The method of claim 26, wherein the method further comprises mixing a gas with the mixture.

28. The method of claim 1, wherein the method further comprises mixing a gas with the mixture.

29. The method of claim 28, wherein the gas is selected from the group consisting of air, nitrogen, carbon dioxide and methane, and mixtures thereof.

30. The method of claim 28, wherein the gas is nitrogen, carbon dioxide or mixtures thereof.

* * * * *